(No Model.)

T. L. McGREGOR.
MANHOLE.

No. 556,474.  Patented Mar. 17, 1896.

Witnesses,
Geo. W. Young
Henry Hankart

Inventor:
Thomas L. McGregor
By H. G. Underwood
Attorneys

UNITED STATES PATENT OFFICE.

THOMAS L. McGREGOR, OF MILWAUKEE, WISCONSIN.

MANHOLE.

SPECIFICATION forming part of Letters Patent No. 556,474, dated March 17, 1896.

Application filed July 10, 1895. Serial No. 555,477. (No model.)

*To all whom it may concern:*

Be it known that I, THOMAS L. MCGREGOR, a citizen of the United States, and a resident of Milwaukee, in the county of Milwaukee and State of Wisconsin, have invented certain new and useful Improvements in Manholes; and I do hereby declare that the following is a full, clear, and exact description thereof.

My invention relates especially to manholes for steam-boilers; and it consists in certain peculiarities of construction, as will be fully set forth hereinafter, and subsequently claimed.

Figure 1:
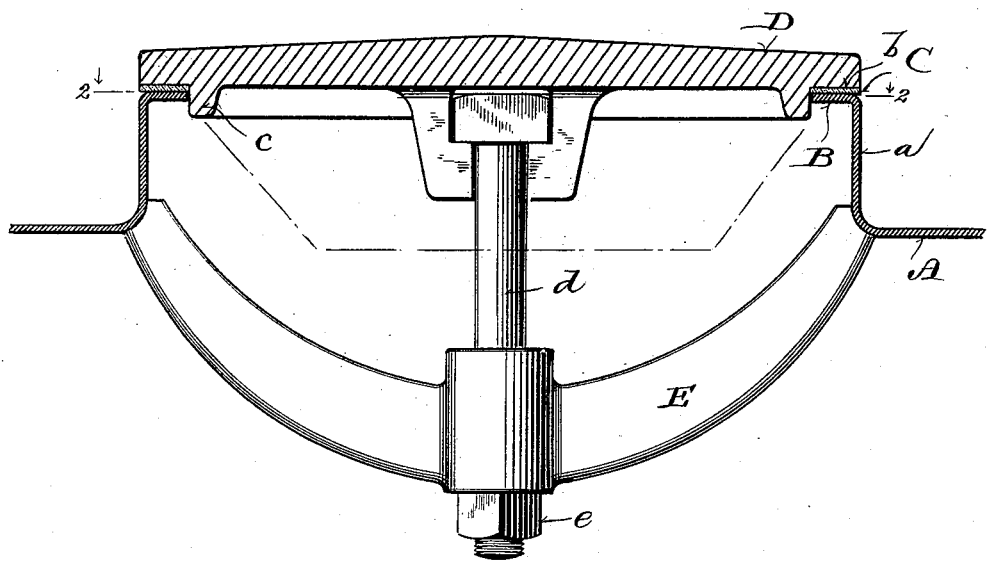
Figure 2:
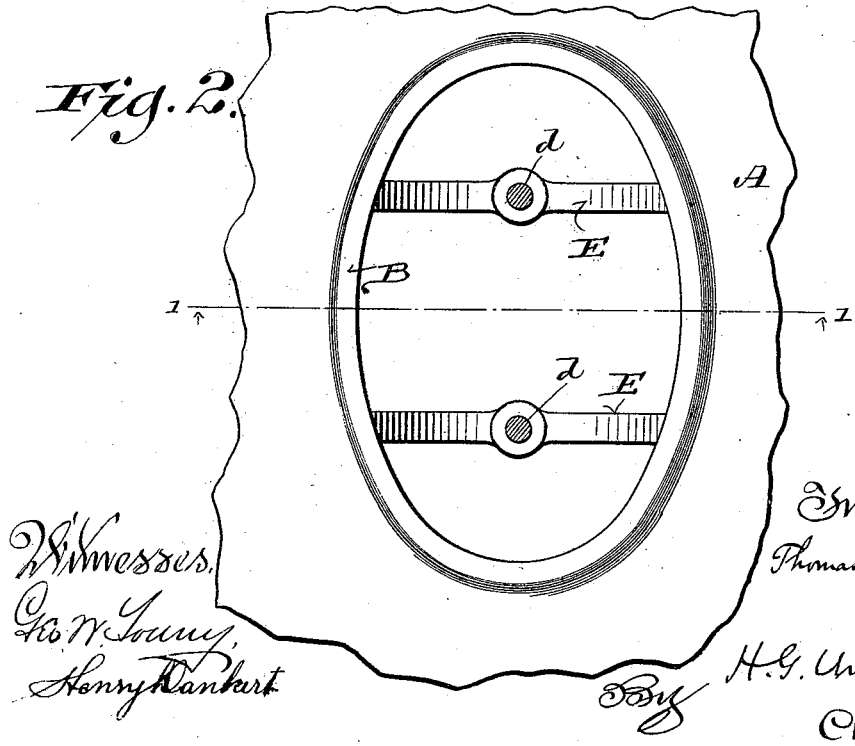

In the drawings, Figure 1 is a view, partly in section on the line 1 1 of Fig. 2, illustrating my invention embodied in the end or head of a boiler. Fig. 2 is an inside view of a portion of said boiler-head and attached parts, partly in section, on the line 2 2 of Fig. 1.

A represents, in this instance, the head of a boiler, *a* the angular flange surrounding the manhole, and B a continuous right-angled inwardly-projecting extension of said flange, which constitutes the essential feature of my present invention. This flange extension I make flat and smooth and of a width equal to that of the gasket C, which latter rests between this flange extension and a seat *b* of equal width formed all around the manhole-plate D exterior to a flange *c* on said plate. This plate is further provided with bolts *d d*, and the usual yokes or "crowfeet" E, and bolts *e*, for securing the parts in place.

Heretofore the gaskets surrounding manholes of this description have been held in place between the plate and the narrow or thin edge of the boiler-flange surrounding the manhole, and when the plate was tightly clamped or screwed to place this narrow or thin edge of the flange has in a very short time cut through the material (usually rubber) of which the gasket was formed, thus quickly destroying it, while by my invention the life of the gasket is greatly prolonged and a better closure of the parts is effected.

Although I have illustrated my invention as embodied in the end or head of a boiler, it will be understood, of course, that I employ the same construction on any part of a boiler, tank or analogous article where a manhole or handhole is formed.

Having thus described my invention, what I claim as new, and desire to secure by Letters Patent, is—

1. In a boiler or analogous article provided with a manhole or analogous opening, an angular flange, surrounding said opening and projecting inward to form a bearing for the yoke, and provided with a flat smooth continuous right-angled inwardly-projecting extension of a width equal to that of the gasket to be applied thereto, substantially as set forth.

2. In a boiler or analogous article provided with a manhole or analogous opening, the combination with an angular flange surrounding said opening and projecting inward to form a bearing for the yoke, and provided with a continuous right-angled inwardly-projecting extension, of a closing-plate having a gasket-seat upon its upper surface entirely surrounding the same, and a gasket interposed between said seat and said flange extension, the said seat, gasket and flange extension being everywhere of equal width, substantially as set forth.

In testimony that I claim the foregoing I have hereunto set my hand, at Milwaukee, in the county of Milwaukee and State of Wisconsin, in the presence of two witnesses.

THOMAS L. McGREGOR.

Witnesses:
   H. G. UNDERWOOD,
   C. W. SCOTT.